O. N. BALDWIN.
CLUTCH MECHANISM.
APPLICATION FILED MAY 23, 1912.

1,130,788.

Patented Mar. 9, 1915.

Witnesses
W. W. Turner
J. Milton Jester

Inventor
Otis N. Baldwin
By A. A. Gourick
Attorney

UNITED STATES PATENT OFFICE.

OTIS N. BALDWIN, OF BAXTER SPRINGS, KANSAS.

CLUTCH MECHANISM.

1,130,788.  Specification of Letters Patent.  Patented Mar. 9, 1915.

Application filed May 23, 1912. Serial No. 699,258.

*To all whom it may concern:*

Be it known that I, OTIS N. BALDWIN, a citizen of the United States, residing at Baxter Springs, in the county of Cherokee and State of Kansas, have invented certain new and useful Improvements in Clutch Mechanism, of which the following is a specification.

This invention relates to clutch mechanisms and more particularly to such structures for transmitting rotary motion in motor vehicles.

An important object is to provide a frictional clutch which will operate when the driving element revolves in either direction, and which is so constructed that in the case of a motor vehicle turning a curve, the driven element of the clutch secured to the outside wheel is capable of turning in advance of the driving member.

A further object is to provide a device of this character which is composed of few parts, is simple in construction, and durable and efficient in service.

With these and other objects in view, my invention consists in the novel arrangement and combination of parts as hereinafter more fully described and claimed.

Figure 1:
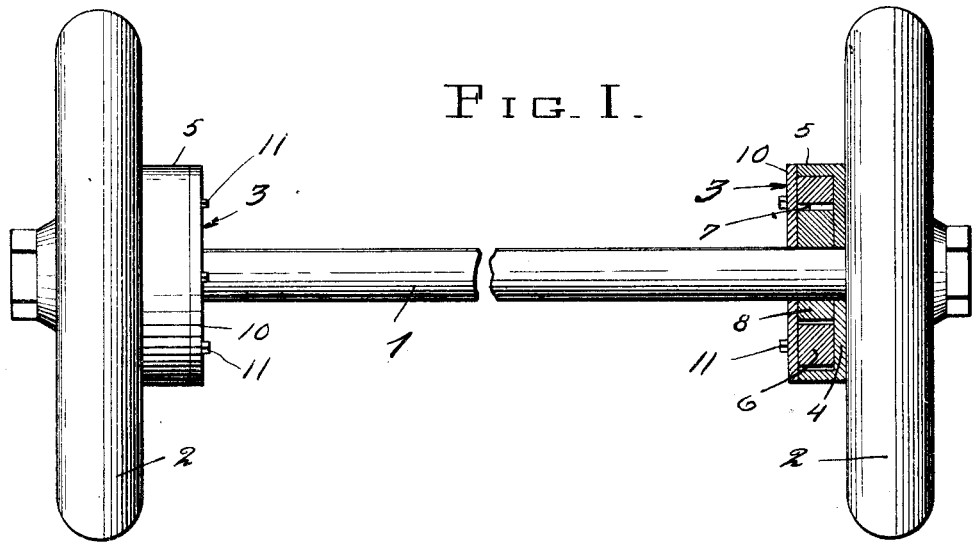
Figure 2:
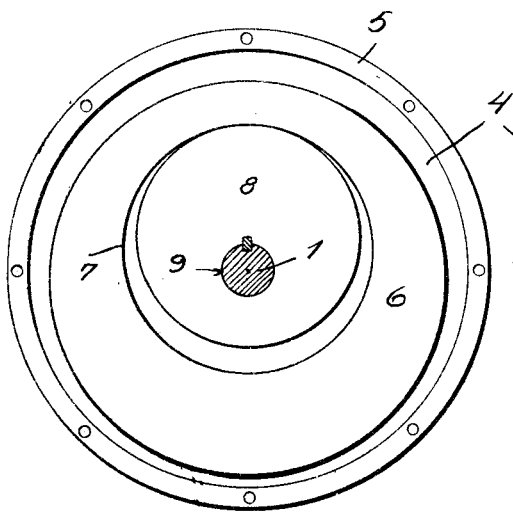
Figure 3:
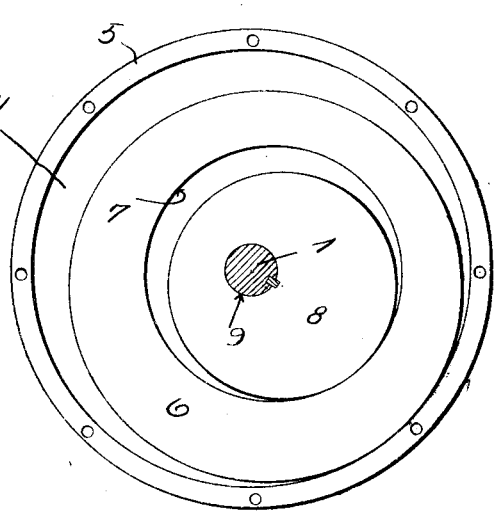

Referring to the drawings forming a part of this specification and in which like numerals are used to designate corresponding parts throughout the several views; Figure 1 is an elevation of an axle having thereon a pair of wheels provided with my improved clutch, parts being broken away and in section to more clearly illustrate the structure, Fig. 2 is a view of my clutch device in intermediate or inoperative position, the cover being removed, and Fig. 3 is a similar view showing the clutch in its gripping or operative position.

Referring more particularly to the drawings, the numeral 1 designates an axle, provided with wheels 2, loosely mounted thereon. My clutch mechanism is adapted to be placed upon each wheel and is indicated as a whole, by the numeral 3. Rigidly secured to the wheel in any suitable manner is a circular plate 4 provided with an annular flange 5, the plate 4 having an opening therethrough for the axle or shaft 1. Within the annular recess formed by the flange 5, and spaced from the walls thereof, is disposed a disk 6, provided with a circular cut-out portion or recess 7 eccentrically of its axis. The weight of this disk 6 is distributed equally around the recess 7, as by reaming or cutting out excess of metal in its broader portions, so that when it rides around on the cam 8 it will not skid or turn ahead of the power and cause it to lock in the wrong direction. In the cam 8 they also have the weight of the metal composing it equalized or distributed over its area in a similar manner. Loosely mounted within this recess 7 is a circular disk or cam 8 provided with an opening 9 eccentrically thereof for the reception of the shaft 1, which is keyed therein.

10 indicates an apertured plate secured to the flange 5 as by means of bolts or screws 11, to exclude dust from the device, and to prevent the displacement of the working parts.

The operation of the device is as follows: The elements of the clutch being in the neutral or inoperative position shown in Fig. 2, movement of the shaft 1 in either direction causes the cam 8 to frictionally engage the disk 6. There not being sufficient space for the complete rotation of the cam, the disk 6 is forced into frictional engagement with the flange 5 on the plate 4, thus locking the driving shaft and the driven member securely together. The outside of the flange 5 is adapted to be used in applying a brake. It will be observed, however, that there is nothing to prevent the flanged plate from traveling faster than the shaft. In the case of a motor vehicle rounding a curve, this structure and action allow the outside wheel to coast, while the inner wheel is driven.

It will be understood that changes in the proportions and construction of my device may be resorted to without departing from the spirit of my invention, or limiting the scope of the subjoined claim.

Having thus described my invention what I claim as new and desire to secure by Letters Patent, is:

A device for transmitting rotary motion comprising a driving element, a cam member carried by said driving element, a driven element having an internal friction surface, and an eccentric band having continuous inner and outer friction surfaces loosely mounted between said driving and driven elements for engagement therewith when in a predetermined position.

In testimony whereof I hereto affix my signature in the presence of two witnesses.

OTIS N. BALDWIN.

Witnesses:
GRAND E. JOHNSON,
LLOYD BALDWIN.